(12) United States Patent
Zhou et al.

(10) Patent No.: US 10,896,180 B2
(45) Date of Patent: Jan. 19, 2021

(54) STATEMENT PARSING METHOD FOR DATABASE STATEMENT

(71) Applicant: China UnionPay Co., Ltd., Shanghai (CN)

(72) Inventors: Jiajing Zhou, Shanghai (CN); Chenguang Pei, Shanghai (CN); Hao Miao, Shanghai (CN); Naigeng Ji, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 16/478,275

(22) PCT Filed: Jan. 9, 2018

(86) PCT No.: PCT/CN2018/071916
§ 371 (c)(1),
(2) Date: Jul. 16, 2019

(87) PCT Pub. No.: WO2018/130142
PCT Pub. Date: Jul. 19, 2018

(65) Prior Publication Data
US 2019/0361899 A1    Nov. 28, 2019

(30) Foreign Application Priority Data

Jan. 16, 2017   (CN) .......................... 2017 1 0029732

(51) Int. Cl.
*G06F 16/2453*    (2019.01)
*G06F 16/242*    (2019.01)
(Continued)

(52) U.S. Cl.
CPC .... *G06F 16/24549* (2019.01); *G06F 16/2255* (2019.01); *G06F 16/2282* (2019.01);
(Continued)

(58) Field of Classification Search
CPC ......... G06F 16/24549; G06F 16/24526; G06F 16/2443; G06F 16/24528; G06F 16/24524;
(Continued)

(56) References Cited

U.S. PATENT DOCUMENTS 6,115,703 A * 9/2000 Bireley ............. G06F 16/24552
707/704
6,985,904 B1 * 1/2006 Kaluskar ........... G06F 16/24539
(Continued)

FOREIGN PATENT DOCUMENTS

CN    104123354 A    10/2014
CN    105373607 A     3/2016
(Continued)

OTHER PUBLICATIONS

Int'l Search Report and Written Opinion dated Apr. 4, 2018 in Int'l Application No. PCT/CN2018/071916.
(Continued)

*Primary Examiner* — David T. Brooks
(74) *Attorney, Agent, or Firm* — Panitch Schwarze Belisario & Nadel LLP

(57) ABSTRACT

A statement parsing method for a database statement comprises: conducting lexical analysis on a database statement inputted into a database, to obtain an inputted word sequence; looking up a statement similarity table according to the inputted word sequence to determine whether there is an existing word sequence similar to the inputted word sequence in the statement similarity table; if yes, obtaining the parsed data corresponding to the existing word sequence from the statement similarity table; otherwise, parsing the inputted word sequence to obtain parsed data corresponding thereto, and storing the inputted word sequence and the corresponding parsed data in the statement similarity table;
(Continued)

and executing the database statement inputted to the database based on the parsed data corresponding to the existing or inputted word sequence. The method can quickly parse a database statement and is favorable for improving the response speed and the working efficiency of a database.

8 Claims, 2 Drawing Sheets

(51) Int. Cl.
    *G06F 16/22*     (2019.01)
    *G06F 16/2452*     (2019.01)
    *G06F 16/27*     (2019.01)
    *G06F 40/205*     (2020.01)

(52) U.S. Cl.
    CPC .... *G06F 16/2443* (2019.01); *G06F 16/24524* (2019.01); *G06F 16/24526* (2019.01); *G06F 16/24528* (2019.01); *G06F 16/275* (2019.01); *G06F 40/205* (2020.01)

(58) Field of Classification Search
    CPC .............. G06F 16/275; G06F 16/2282; G06F 16/2255; G06F 17/2705; G06F 8/425; G06F 8/427; G06F 40/205; G06F 16/242
    See application file for complete search history.

(56) References Cited

U.S. PATENT DOCUMENTS

| | | | | |
|---|---|---|---|---|
| 7,174,326 | B2* | 2/2007 | Ireland | G06F 16/24539 |
| 7,702,623 | B2* | 4/2010 | Lee | G06F 16/24547 |
| | | | | 707/999.003 |
| 2003/0200204 | A1* | 10/2003 | Limoges | G06F 16/2433 |
| 2003/0236780 | A1* | 12/2003 | Saha | G06F 16/24539 |
| 2008/0059462 | A1* | 3/2008 | Millett | G06F 16/2264 |
| 2010/0262604 | A1 | 10/2010 | Akaboshi | |
| 2012/0278305 | A1* | 11/2012 | Wei | G06F 16/2455 |
| | | | | 707/713 |
| 2016/0205101 | A1* | 7/2016 | Verma | G06F 17/277 |
| | | | | 726/1 |
| 2016/0342652 | A1* | 11/2016 | Baranczyk | G06F 16/248 |

FOREIGN PATENT DOCUMENTS

| | | |
|---|---|---|
| CN | 105718593 A | 6/2016 |
| CN | 107025263 A | 8/2017 |

OTHER PUBLICATIONS

Int'l Preliminary Report on Patentability dated Jul. 16, 2019 in Int'l Application No. PCT/CN2018/071916.

* cited by examiner

STATEMENT PARSING METHOD FOR DATABASE STATEMENT

TECHNICAL FIELD

The present application relates to the field of database technique, and more particularly, to a statement parsing method for a database statement.

BACKGROUND

Statement parsing, which is widely applied to the computer field, is one of fundamental technologies for the interaction between human and computers, and enables the interpretation from the quasi natural language to machine languages such as XML, SQL, C and JAVA which represent important applications of the statement parsing.

Generally, the statement parsing includes two stages of lexical analysis and grammar parsing, where the lexical analysis is used to divide a statement into a sequence of words, while the grammar parsing is used to create a grammar tree or other internal data structure according to the sequence of words, and a parsed result obtained from the grammar parsing will be used for the subsequent data calculating.

In the field of database, the Structured Query Language (SQL) is a widely accepted language and is accompanied with a set of SQL92 grammar, while various database products are accompanied with respective specific grammar based on the SQL 92 grammar. Database processing is performed by a basis logic that: a client sends an SQL statement to a database on a server, and the server performs lexical analysis and then grammar parsing on the SQL statement to convert the SQL statement into a data structure executable within the computer.

The SQL statements, which act as a bridge between a database user and database operations, are relatively complicated and significantly different from each other, thus numerous data resources are consumed by parsing the SQL statements during database processing. To reduce the performance consumption by the parsing of the SQL statements, two conventional solutions are adopted in the field of database and include: 1) reusing an SQL parsed result for the same statement (generally for executing a plan, for example); and 2) providing a Prepare statement which allows a user to replace variable data with a symbol "?" to reduce the differences between the statements. With the above two solutions, the grammar parsing for all statements is avoided, thereby improving the processing performance of the database server.

However, the above conventional solutions are defective as follows. Firstly, the reuse granularity of the parsing is too small because only identical statements can reuse the parsed result, resulting in a large amount of buffered data. Secondly, the replacement of variable contents in the statement with the symbol "?" is not friendly enough to the user. Furthermore, the above conventional solutions are designed for the features of the SQL language and thus are difficult in applying to the paring of other languages. For example, it is not feasible to require a programmer to replace variable contents in his/her written codes with the symbol "?" for the purpose of improving merely the parsing speed of the complier.

SUMMARY

An object of the present invention is to provide a statement parsing method for a database statement. The method is capable of operating independent of the types of database languages, parsing database statements quickly, and further improving the response speed and operation efficiency of the database.

For the purpose of the above object, the following technical solutions are provided in the present application.

A statement parsing method for a database statement includes steps of: performing lexical analysis on a database statement inputted to a database, to obtain an inputted word sequence; looking up a statement similarity table according to the inputted word sequence, to determine whether an existing word sequence similar with the inputted word sequence is present in the statement similarity table, wherein the statement similarity table is configured to record correspondence relationships between various existing word sequences and parsed data, the existing word sequence is obtained by the lexical analysis on the database statement and the parsed data is used by the database for executing the database statement; obtaining from the statement similarity table the parsed data corresponding to the existing word sequence similar with the inputted word sequence, if the existing word sequence similar with the inputted word sequence is present in the statement similarity table; and if the existing word sequence similar with the inputted word sequence is not present in the statement similarity table, parsing the inputted word sequence to obtain the parsed data corresponding to the inputted word sequence, and storing the inputted word sequence and the corresponding parsed data in the statement similarity table; and executing the database statement inputted to the database based on the parsed data corresponding to the inputted word sequence or the existing word sequence similar with the inputted word sequence.

Preferably, the statement similarity table further includes a hash subtable which records correspondence relationships between hash values of various existing word sequences and the parsed data, and obtaining from the statement similarity table the parsed data corresponding to the existing word sequence similar with the inputted word sequence particularly includes: determining the parsed data corresponding to the existing word sequence similar with the inputted word sequence according to a hash value corresponding to the existing word sequence similar with the inputted word sequence.

Preferably, determining whether an existing word sequence similar with the inputted word sequence is present in the statement similarity table includes: for each existing word sequence in the statement similarity table, comparing the number and positions of words obtained from the lexical analysis of the existing word sequence and the number and positions of words obtained from the lexical analysis of the inputted word sequence, determining that the existing word sequence similar with the inputted word sequence is present in the statement similarity table if the number and positions of words obtained from the lexical analysis of the existing word sequence are the same as the number and positions of words obtained from the lexical analysis of the inputted word sequence, respectively.

Preferably, the hash value of the existing word sequence is calculated based on positions and hash values of all words of the existing word sequence obtained from the lexical analysis on the existing word sequence.

The present application further discloses a database including: a statement parsing unit and a statement similarity table, where the statement parsing unit is configured to parse a database statement inputted to the database according to the statement similarity table by using the above described method.

Another object of the present invention is to provide a statement parsing method for a database statement. With the use of the method, the comparison of similarity between statements is partially performed at the client to reduce the workload of the database.

For the purpose of the above object, another technical solution is provided in the present application as below.

A statement parsing method for a database statement including steps of: performing lexical analysis on a database statement inputted to a client, to obtain an inputted word sequence; looking up a statement similarity table at the client according to the inputted word sequence, to determine whether an existing word sequence similar with the inputted word sequence is present in the statement similarity table at the client; wherein the statement similarity table at the client records various existing word sequences different from each other, and the existing word sequence is obtained by the lexical analysis on the database statement; sending a similar statement parsing request to the database by the client, if the existing word sequence similar with the inputted word sequence is present in the statement similarity table at the client; looking up the statement similarity table at the database end according to the similar statement parsing request, to determine the parsed data corresponding to the similar statement parsing request, wherein the statement similarity table at the database end records correspondence relationships between the similar statement parsing requests and the parsed data, and the parsed data is used by the database for executing database statements; executing by the database the database statement inputted to the client, based on the parsed data corresponding to the similar statement parsing request; and returning by the database an execution result to the client; wherein the statement similarity table at the client corresponds to and is updated synchronously with the statement similarity table at the database end.

The present application further discloses a database application system including: a database server configured to maintain a statement similarity table at a database end; and a plurality of clients each configured to maintain a statement similarity table at a client end, where the database application system utilizes the above-described method to parse and execute a database statement inputted to the client.

The statement parsing method for a database statement as provided in the present application is capable of parsing database statements quickly, is advantageous for improving the response speed and operation efficiency of the database, is suitable for a wide range of application scenarios at a low cost, and facilitates developers in developing databases in a more efficient way.

DETAILED DESCRIPTION

Figure 1:
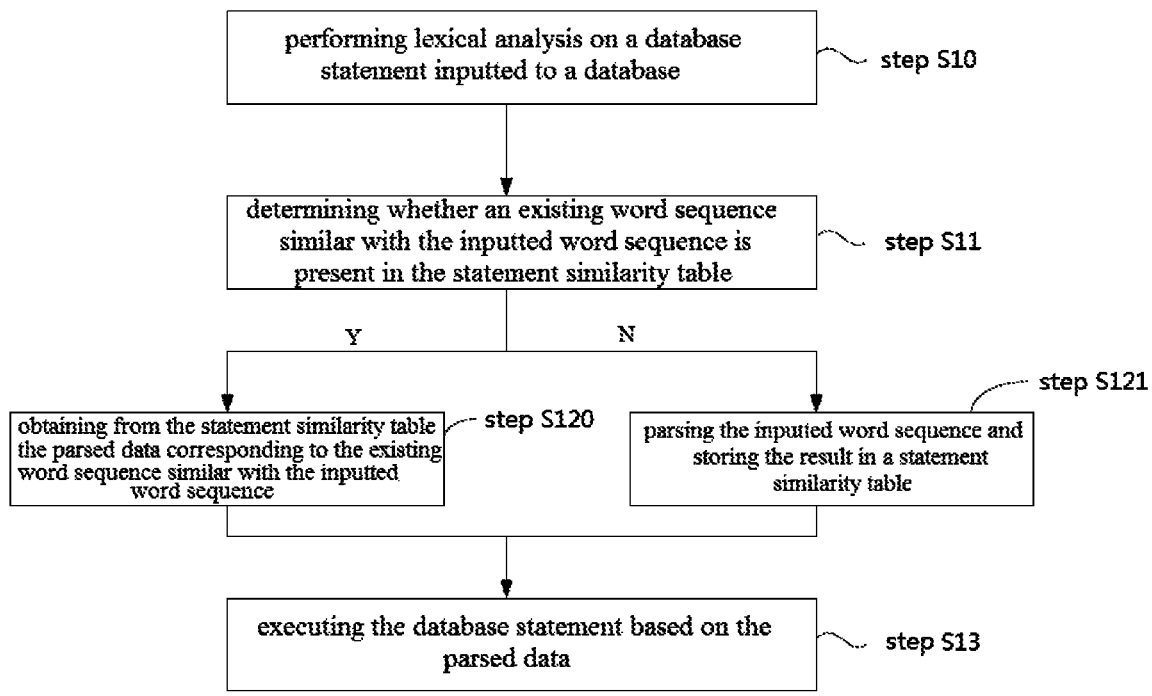
FIG. 1 shows a schematic flow chart of a statement parsing method for a database statement provided according to a first embodiment of the present invention.
Figure 2:
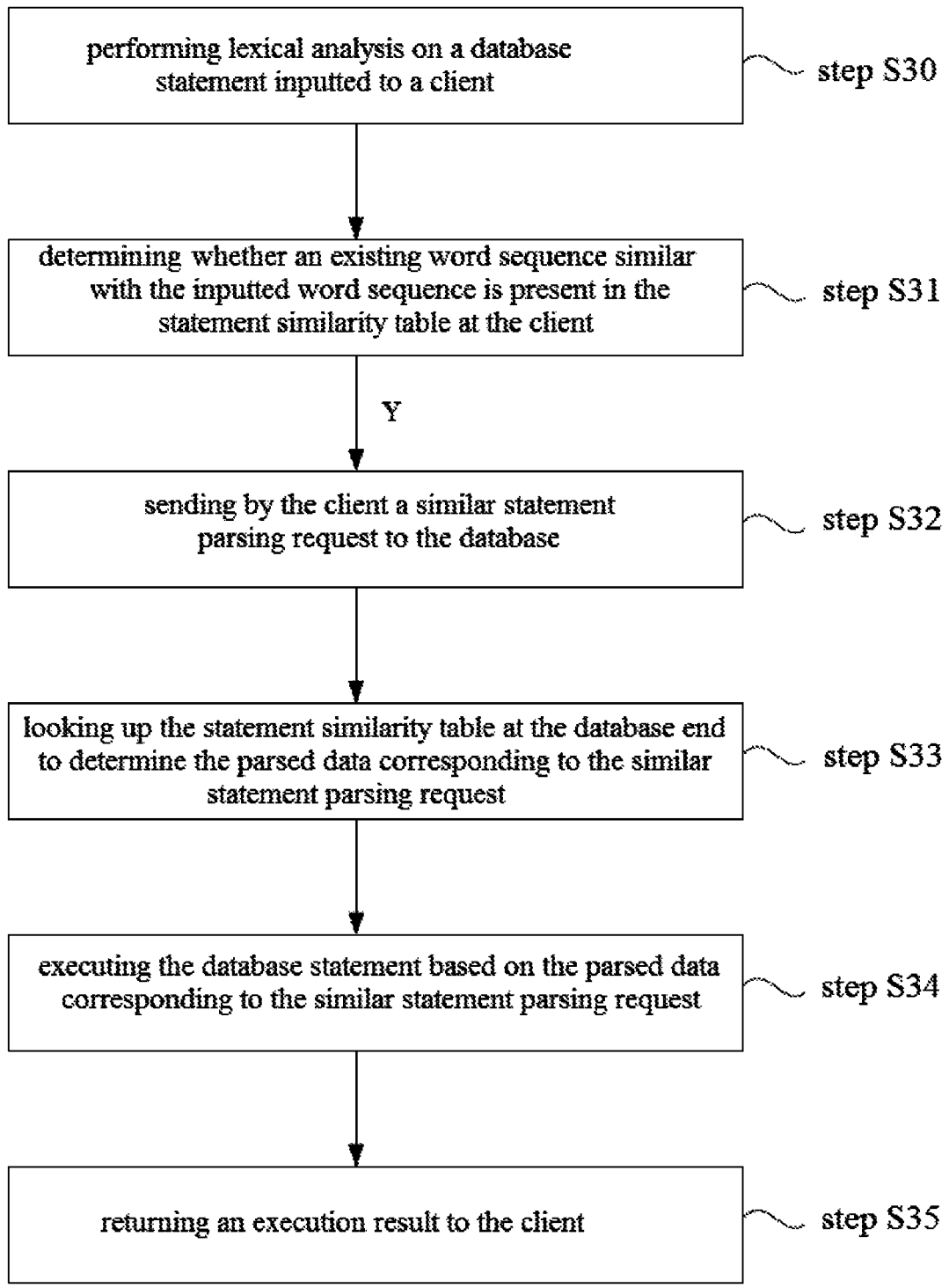
FIG. 2 shows a schematic flow chart of a statement parsing method for a database statement provided according to a third embodiment of the present invention.

As shown in FIG. 1, the statement parsing method for a database statement provided according to a first embodiment of the present invention includes the following steps S10, S11 and S13.

At step S10, lexical analysis is performed on a database statement inputted to a database to obtain an inputted word sequence.

At step S11, a statement similarity table is looked up according to the inputted word sequence, to determine whether an existing word sequence similar with the inputted word sequence is present in the statement similarity table.

Here, the statement similarity table is used to record the correspondence relationships between various existing word sequences and parsed data, where the existing word sequences may be obtained by the lexical analysis on database statements and the parsed data may be used by the database for executing database statements.

Particularly, the description below is made by taking an example with the following three SQL statements of:

1: select*from tbl1 where a=123;
2: select*from tbl1 where a=1;
3: SELECT*FROM tbl1 WHERE A=3.

To obtain a word sequence from the lexical analysis, words of a statement are generally classified into key words, variable names and values, regardless of the letter cases (i.e. the upper and lower cases). For example, the SQL statement No. 1 may be parsed to obtain a word sequence like [select,*,from,tbl1,where,a,=,123], among which [select,*, from,where,=] are key words, [tbl1,a] are variable names, and [123] is a value. Thus, as can be seen, similar lexical word sequences can be obtained from the SQL statements Nos. 1-3.

In a preferable embodiment, the statement similarity table may further include a hash subtable which records correspondence relationships between hash values of various existing word sequences and the parsed data.

Here, the hash value of the existing word sequence may be calculated in a manner based on positions and hash values of all words of the existing word sequence obtained from the lexical analysis on the existing word sequence, that is, the hash value of the existing word sequence is a value obtained by the weighted combined calculation.

In particular, reference is now made again to the example with the above three SQL statements, the hash value of a word sequence of each of the three SQL statements may be calculated by a method including, for example, 1) performing the lexical analysis on the database statement to obtain a word sequence;
2) if a word of the word sequence is of the type "value", setting the hash value of the word as a fixed value such as 1; and if the word is of other types, setting the hash value of the word as a hash value of a character string of the lower case converted from the word;
3) initializing the value of sql_hash, for example, as sql_hash=7;
4) executing a pseudocode below on each word of the word sequence sequentially from the beginning word of the word sequence, to shift and sum the hash value of each word,
sql_hash=sql_hash<<3+hash (the current word), and
5) designating the final value of sql_hash as the hash value of the word sequence.

With the above method, it can be seen that the hash values of the word sequences of the respective SQL statements Nos. 1, 2, and 3 are identical.

At step S11, determining whether an existing word sequence similar with the inputted word sequence is present in the statement similarity table may be particularly implemented by: for each existing word sequence in the statement similarity table, comparing the number and positions of words obtained from the lexical analysis of the existing word sequence and the number and positions of words obtained from the lexical analysis of the inputted word sequence, determining that an existing word sequence similar with the inputted word sequence is present in the statement similarity table if the number and positions of words obtained from the lexical analysis of the existing word sequence are the same as the number and positions of words obtained from the lexical analysis of the inputted word sequence, respectively, and determining that an existing word sequence similar with the inputted word sequence is not present in the statement similarity table if the number or positions of words obtained from the lexical analysis of the existing word sequence is different from the number or positions of words obtained from the lexical analysis of the inputted word sequence.

To improve the response speed of the database, preferably a copy of the statement similarity table is stored in a buffer for the database, it is possible to more quickly determine whether an existing word sequence similar with the inputted word sequence is present in the statement similarity table by looking up the copy of the statement similarity table in the buffer.

At step S120, the parsed data corresponding to the existing word sequence similar with the inputted word sequence is obtained from the statement similarity table, if the existing word sequence similar with the inputted word sequence is present in the statement similarity table.

In the case where the statement similarity table further includes a hash subtable, correspondingly at step S120, the parsed data corresponding to the existing word sequence similar with the inputted word sequence is determined according to the hash value corresponding to the existing word sequence similar with the inputted word sequence. It would be appreciated by those skilled in the art that the efficiency and precision of determining the parsed data can be increased with the use of the hash value.

At step S121, if an existing word sequence similar with the inputted word sequence is not present in the statement similarity table, the inputted word sequence is parsed to obtain the parsed data corresponding to the inputted word sequence, and the inputted word sequence and the corresponding parsed data are stored in the statement similarity table.

At step S13, the database statement inputted to the database is executed based on the parsed data corresponding to the inputted word sequence or the existing word sequence similar with the inputted word sequence.

It would be appreciated that, according to the first embodiment of the present invention, by determining whether an existing word sequence similar with the inputted word sequence is present in the statement similarity table or not, the parsed data can be quickly obtained and directly utilized in the presence of the existing word sequence similar with the inputted word sequence, thus with the use of the statement parsing method, the database statement can be quickly parsed, and the response speed and operation efficiency of the database can be improved.

Further, the method of the first embodiment can be carried out independent of the type of the database language, thus is suitable for various database languages and a wider range of scenarios, and provides a more convenient development mode for database developers.

As a further improvement of the above first embodiment, a similarity flag may be allocated for a database statement at a database, where similar database statements share the same similarity flag, but different similarity flags are allocated for dissimilar database statements. Preferably, the similarity flag is generated when a new record is inserted to the statement similarity table at the server, by a unique identifier generating rule such as: 1) successive accumulation, and 2) the use of a memory address corresponding to a buffered value in similarity hash. The correspondence relationship between the similarity flag and the parsed data may be maintained in the database, for example by way of an array or memory address lookup, that is, the parsed data of the corresponding similar statement can be uniquely found by the similarity flag.

A second embodiment of the present invention provides a database (not shown), which includes a statement parsing unit and a statement similarity table, where the statement parsing unit is configured to parse a database statement inputted to the database according to the statement similarity table by using the method provided by the above first embodiment.

A third embodiment of the present invention provides another statement parsing method for a database statement, and the method includes the following steps S30, S31, S32, S33, S34, and S35.

At step S30, lexical analysis is performed on a database statement inputted to a client to obtain an inputted word sequence.

At step S31, a statement similarity table at the client is looked up according to the inputted word sequence, to determine whether an existing word sequence similar with the inputted word sequence is present in the statement similarity table at the client.

Here, the statement similarity table at the client is used to record the various existing word sequences different from each other, and the existing word sequences may be obtained by the lexical analysis on database statements.

At step S32, if an existing word sequence similar with the inputted word sequence is present in the statement similarity table at the client, a similar statement parsing request is sent to the database by the client.

At step S33, the statement similarity table at the database end is looked up according to the similar statement parsing request, to determine the parsed data corresponding to the similar statement parsing request.

Here, the statement similarity table at the database end records the correspondence relationships between the similar statement parsing requests and the parsed data, and the parsed data may be used by the database for executing database statements.

At step S34, the database executes the database statement inputted to the client, based on the parsed data corresponding to the similar statement parsing request.

At step S35, the database returns an execution result to the client.

According to the third embodiment, the statement similarity table at the client corresponds to and is updated synchronously with the statement similarity table at the database end.

As an improvement to the third embodiment, it is possible for the client to send a database statement execution request to the server (database) and the server returns an execution result to the client. A similarity flag is allocated for a database statement at the database, and is communicated to the client. Similar database statements share the same similarity flag, but different similarity flags are allocated for dissimilar database statements.

Particularly, the lexical analysis is performed on the database statement at the client, then the statement similarity flag corresponding to the database statement is searched locally at the client, and if the statement similarity flag corresponding to the database statement is present, the statement similarity flag is sent to the server (database), which in turn searches for the corresponding reused parsed data according to the similarity flag and directly utilizes the parsed data as searched out. If the statement similarity flag is not searched out at the client, the word sequence obtained from the lexical analysis is sent from the client to the server, which parses the word sequence upon receipt and generates a new statement similarity flag.

In the client/server application scenario of the above third embodiment, the lexical analysis and the looking up of the statement similarity table are allocated to the client for execution, so that the work load of the server (database) is significantly reduced, thereby improving the data processing capability at the server end.

A fourth embodiment of the present invention provides a database application system including: a database server configured to maintain a statement similarity table at the database end; and a plurality of clients each configured to maintain a statement similarity table at the client end. Here, the database application system utilizes the method provided in the third embodiment to parse and execute the database statement inputted to the client.

Some preferable embodiments of the present invention have been described as above but are not intended to limit the scope of the present invention. Various modified designs may be made by those skilled in the art without departing from the concept of the present invention and the accompanying claims.

What is claimed is:

1. A statement parsing method for a database statement comprising steps of:
    performing lexical analysis on a database statement inputted to a database, to obtain an inputted word sequence;
    looking up a statement similarity table according to the inputted word sequence, to determine whether an existing word sequence similar with the inputted word sequence is present in the statement similarity table, wherein the statement similarity table is configured to record correspondence relationships between a plurality of existing word sequences and respective parsed data, the plurality of existing word sequences have been obtained by the lexical analysis on respective database statements, and the respective parsed data have been obtained respectively by a grammar parsing on the plurality of existing word sequences and have been used by the database for executing the respective database statements;
    obtaining from the statement similarity table parsed data corresponding to the existing word sequence similar with the inputted word sequence, if the existing word sequence similar with the inputted word sequence is present in the statement similarity table; and if the existing word sequence similar with the inputted word sequence is not present in the statement similarity table, parsing the inputted word sequence to obtain the parsed data corresponding to the inputted word sequence, and storing the inputted word sequence and the corresponding parsed data in the statement similarity table; and
    executing the database statement inputted to the database based on the parsed data corresponding to the inputted word sequence or the existing word sequence similar with the inputted word sequence.

2. The method of claim 1, wherein the statement similarity table further includes a hash subtable which records correspondence relationships between hash values of the plurality of existing word sequences and the respective parsed data,
    wherein obtaining from the statement similarity table parsed data corresponding to the existing word sequence similar with the inputted word sequence particularly includes: determining the parsed data corresponding to the existing word sequence similar with the inputted word sequence according to a hash value corresponding to the existing word sequence similar with the inputted word sequence.

3. The method of claim 1, wherein determining whether an existing word sequence similar with the inputted word sequence is present in the statement similarity table includes:
    for each existing word sequence in the statement similarity table, comparing the number and positions of words obtained from the lexical analysis of the existing word sequence and the number and positions of words obtained from the lexical analysis of the inputted word sequence, determining that the existing word sequence similar with the inputted word sequence is present in the statement similarity table if the number and positions of words obtained from the lexical analysis of the existing word sequence are the same as the number and positions of words obtained from the lexical analysis of the inputted word sequence, respectively.

4. The method of claim 2, wherein the hash value of the existing word sequence is calculated based on positions and hash values of all words of the existing word sequence obtained from the lexical analysis on the existing word sequence.

5. The method of claim 1, wherein a copy of the statement similarity table is stored in a buffer for the database.

6. A server comprising a database which comprises a statement similarity table, wherein the server is configured to parse a database statement inputted to the database according to the statement similarity table by using the method of claim 1.

7. A statement parsing method for a database statement, comprising steps of:
    performing lexical analysis on a database statement inputted to a client, to obtain an inputted word sequence;
    looking up a statement similarity table at the client according to the inputted word sequence, to determine whether an existing word sequence similar with the inputted word sequence is present in the statement similarity table at the client; wherein the statement similarity table at the client records a plurality of existing word sequences different from each other, and the plurality of existing word sequences have been obtained by the lexical analysis on respective database statements;
    sending a similar statement parsing request corresponding to the existing word sequence similar with the inputted word sequence to the database by the client, if the existing word sequence similar with the inputted word sequence is present in the statement similarity table at the client;
    looking up the statement similarity table at the database end according to the similar statement parsing request, to determine parsed data corresponding to the similar statement parsing request, wherein the statement similarity table at the database end records correspondence relationships between a plurality of similar statement parsing requests and respective parsed data, and the respective parsed data have been obtained respectively by a grammar parsing on the plurality of existing word sequences respectively corresponding to the plurality of similar statement parsing requests and have been used by the database for executing the respective database statements;

executing by the database the database statement inputted to the client, based on the parsed data corresponding to the similar statement parsing request; and returning by the database an execution result to the client;

wherein the statement similarity table at the client corresponds to and is updated synchronously with the statement similarity table at the database end.

8. A database application system comprising:

a database server configured to maintain a statement similarity table at a database end; and a plurality of clients each configured to maintain a statement similarity table at a client end, wherein, the database application system utilizes the method of claim 7 to parse and execute a database statement inputted to the client.

* * * * *